United States Patent Office 3,485,924
Patented Dec. 23, 1969

3,485,924
PHARMACEUTICAL COMPOSITIONS AND
METHODS FOR REDUCING APPETITE
IN ANIMALS
Philippe Rohrbach, Paris, and Jean Blum, Epinay-sur-Seine, France, assignors to Manufactures J. R. Bottu, Saint-Jean-De-Livet, Calvados, France, a French society
No Drawing. Filed Apr. 22, 1966, Ser. No. 544,377
Claims priority, application France, Apr. 26, 1965, 14,637; Jan. 5, 1966, 44,827
Int. Cl. A61k 27/00; C07c 87/27
U.S. Cl. 424—304                32 Claims

ABSTRACT OF THE DISCLOSURE

Composition and process for reducing appetite in animals wherein the composition is comprised of either racemic, dextrorotatory or laevorotatory N-($\beta$-cyanoethyl)-$\alpha$-methyl-$\beta$-phenylethylamine, N-methyl-N-($\beta$-cyanoethyl)-$\alpha$-methyl-$\beta$-phenylethylamine or pharmaceutically acceptable acid addition salts thereof, in association with a pharmaceutically acceptable and compatible diluent.

---

This invention relates to pharmaceutical compositions having anorexigenic and analeptic activity.

The compositions of the invention comprise, in association with a pharmaceutically acceptable and compatible diluent, at least one compound of the formula:

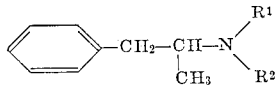

in which $R^1$ is hydrogen or methyl and $R^2$ is cyanoethyl as racemic or optically active base or pharmaceutically acceptable acid addition salt.

The most valuable compounds of the above-given formula are N-($\beta$-cyanoethyl)-$\alpha$-methyl-$\beta$-phenylethylamine, N-methyl-N-($\beta$-cyanoethyl)-$\alpha$-methyl-$\beta$-phenylethylamine. These compounds are described in the literature (J. Amer. Chem. Soc. 80, No. 22, page 5946 and Ukhrain. Khim. Zhur. 1957 23, pages 637–641), but their interesting pharmacological and therapeutic properties have until now not been described.

N-($\beta$-cyanoethyl)-$\alpha$-methyl-$\beta$-phenylethylamine can be prepared by causing acrylonitrile to react with $\alpha$-methyl-$\beta$-phenylethylamine, for example using an excess of acrylonitrile as solvent, either at ambient temperature or at reflux temperature, for from 6 to 24 hours. The desired compound is separated by the usual methods, such as evaporation of the solvent and distillation. The acid addition salts of this compound (and of the other bases of the above-given formula) may be made by methods known per se, e.g. by reaction with mineral or organic acids, such as hydrochloric, hydrobromic, sulphuric, phosphoric, benzoic or cinnamic acid.

N-methyl-N-($\beta$-cyanoethyl)-$\alpha$-methyl-$\beta$-phenylethylamine can be prepared by reacting acrylinitrile with N-methyl-$\alpha$-methyl-$\beta$-phenylethylamine, for example using an excess of acrylonitrile as solvent, either at ambient temperature or at reflux temperature. The desired compound is separated by the usual methods, such as evaporation of the solvent and distillation.

The following example illustrate the preparation of the compounds used in the new compositions.

EXAMPLE 1

(a) 22 g. of acrylonitrile and 27 g. of racemic $\alpha$-methyl-$\beta$-phenylethylamine were introduced into a 100 ml. round-bottomed flask and left standing for 18 hours at ambient temperature, and then the mixture was boiled under reflux for 12½ hours. The excess acrylonitrile was then evaporated in vacuo and the residue distilled. 27.3 g. (yield: 72.6%) of racemic N-($\beta$-cyanoethyl)-$\alpha$-methyl-$\beta$-phenylethylamine were obtained as an oily liquid, B.P.=126–127° C./2 mm. Hg.

(b) 22 g. of the base obtained in (a) were dissolved in 80 ml. of anhydrous diethyl ether and an ethereal solution of hydrochloric acid added until the pH value was 1. The salt was filtered off, dried and washed with 10 ml. of diethyl ether. 18 g. (yield: 68%) of N-($\beta$-cyanoethyl)-$\alpha$-methyl-$\beta$-phenylethylamine hydrochloride were obtained, after recrystallisation from absolute ethanol, as a white, micro-crystalline, odourless powder having a bitter, acid taste; it was fairly soluble in water, soluble in 95% ethanol and acetone, sparingly soluble in ether and benzene. Melting point - 146° C. on a Kofler block.

Analysis for $C_{12}H_{17}N_2Cl$.—Calculated percent: N=12.47; C=16.26. Found percent: N=12.65; Cl=16.10.

EXAMPLE 2

Following the procedure of Example 1(a) starting with 22 g of acrylonitrile and 26.5 g. of laevorotatory $\alpha$-methyl-$\beta$-phenylethylamine, 27.5 g. of laevorotatory N-($\beta$-cyanoethyl)-$\alpha$-methyl-$\beta$-phenylethylamine having a boiling point=121–123° C./2 mm. Hg were obtained.

Following the procedure of Example 1(b) starting with 20 g. of the laevorotatory base, 16.3 g. of laevorotatory N-($\beta$-cyanoethyl)-$\alpha$-phenylethylamine hydrochloride were obtained, after recrystallisation from an ethanol-methanol mixture as a white, micro-crystalline and odourless powder having a bitter, acid taste; it was fairly soluble in water, soluble in 95% ethanol and acetone, sparingly soluble in chloroform and very sparingly soluble in diethyl ether and benzene. Melting point=177° C. on a Kofler block; $(\alpha)_D^{20}$ in 10% aqueous solution (p./v.): $-19° 5' \pm 1°$.

Analysis for $C_{12}H_{17}N_2Cl$.—Calculated percent: N=12.47; Cl=16.26. Found percent: N=12.60; Cl=15.80.

EXAMPLE 3

Following the procedure of Example 1(a) starting with 20 g. of acrylonitrile and 24 g. of dextrorotatory $\alpha$-methyl-$\beta$-phenylethylamine, 16.5 g. of dextrorotatory N-($\beta$-cyanoethyl)-$\alpha$-methyl-$\beta$-phenylethylamine having a boiling point=111–112° C./3 mm. Hg were obtained.

Following the procedure of Example 1(b) starting with 16.2 g. of the above dextrorotatory base, 15.2 g. of dextrorotatory N-($\beta$-cyanoethyl)-$\alpha$-methyl-$\beta$-phenylethylamine hydrochloride were obtained, after recrystallisation from a methanol-ethanol mixture, as a white micro-crystalline and odourless powder having a bitter, acid taste; it was fairly soluble in water, soluble in 95% ethanol and acetone, sparingly soluble in chloroform and very sparingly soluble in diethyl ether and benzene. Melting point =177° C. on a Kofler block. $(\alpha)_D^{20}$ 10% aqueous solution (p./v.) $-19° 5' \pm 1°$.

Analysis for $C_{12}H_{17}N_2Cl$.—Calculated percent: N=12.47; Cl=16.26. Found percent: N=12.65; Cl=16.00.

EXAMPLE 4

(a) 8 g. (0.15 mol) of acrylonitrile and 10 g. (0.067 mol) of N-methyl-$\alpha$-methyl-$\beta$-phenylethylamine were introduced into a 100 ml. round-bottomed flask, left to stand for 72 hours at ambient temperature and then boiled under reflux for 8 hours. The excess acrylonitrile was then evaported in vacuo and the residue distilled. 10 g. (yield: 73.7%) of N-methyl-N-($\beta$-cyanoethyl)-$\alpha$-methyl-$\beta$-phenyl-ethylamine as an oily liquid were obtained; boiling point=112–113° C./2 mm. Hg.

(b) 20.2 g. of the base obtained as in (a) were dissolved in 100 ml. of anhydrous diethyl ether and an ethereal solution of hydrochloric acid was added until the pH was 1. The salt was filtered off, dried and washed with 10 ml. of diethyl ether. 19 g. (yield 80%) of N-methyl-N-($\beta$-cyanoethyl)-$\alpha$-methyl-$\beta$-phenylethylamine hydrochloride were obtained, after recrystallisation from isopropanol, as a white, micro-crystalline and odourless powder having a bitter, acid taste; this hydrochloride was fairly soluble in water, soluble in 95% ethanol and acetone, sparingly soluble in chloroform and very sparingly soluble in diethyl ether and benzene. Melting point=179–180° C.

Analysis for $C_{13}H_{19}N_2Cl$.—Calculated percent: Cl=14.89; N=11.74. Found percent: Cl=14.60; N=11.60.

The toxicological and pharmacological properties of these compounds are set out in the following description. The compounds were compared with phentermine and amphetamine.

The compounds investigated were the racemic hydrochloride, laevorotatory hydrochloride and dextrorotatory hydrochloride of N-($\beta$-cyanoethyl)-$\alpha$-methyl-$\beta$-phenylethylamine, and the hydrochloride of N-methyl-N-($\beta$-cyanoethyl)-$\alpha$-methyl-$\beta$-phenylethylamine which are hereinafter referred to as Compounds Nos. 1, 2, 3, and 4.

1. Acute toxicity

The $LD_{50}$ values were calculated by the method of Miller and Tainter (proc. Soc. Exp. Biol. Med. 1944, 57, page 261) after oral administration to a mouse.
They were:

65 mg./kg. for compound No. 1,
110 mg./kg. for compound No. 2,
38 mg./kg. for compound No. 3, and
170 mg./kg. for compound No. 4, while the $LD_{50}$ values of phentermine hydrochloride and of racemic amphetamine sulphate were 85 mg./kg. and 22 mg./kg. respectively.

2. Anorexigenic activity (a) In rats.—The animals were conditioned beforehand to eating their food only during a daily period of 7 hours and it was thus possible to determine the average consumption of the batches of rats (10 animals per batch). the derivative under investigation was administered per os, once per week, 1 hour before the food was given to two batches of animals. The quantity of food consumed in 7 hours (8 hours after administration of the product) is set out as a percentage of the average quantity consumed during the comparison days: it is thus possible to calculate the anorexigenic effect quantitatively. The investigation was cross-checked, the average of the results is set out in the following Table I:

TABLE I

| Product | Dose, mg./kg. | Percent of appetite inhibition after— | | |
|---|---|---|---|---|
| | | 1 hour | 4 hours | 7 hours |
| Phentermine | 15 | 97 | 72 | 45 |
| Compound No. 1 | 15 | 100 | 87 | 53 |
| Compound No. 2 | 15 | 100 | 72 | 49 |
| Compound No. 3 | 15 | 100 | 83 | 63 |
| Compound No. 4 | 15 | 95.4 | 54.2 | 30.4 |

According to these results, the derivatives according to the invention have an activity which is comparable to that of phentermine one hour after administration, but their action, particularly that of compounds Nos. 1, 2 and 3, has a more lasting effect.

(b) In dogs.—The average consumption of the dogs being used over one week was established beforehand and then the product under test was administered 1 hour before supplying the food, which was left available to the animals for seven hours. The food was weighed at the following times after administration: 15 minutes, 30 minutes, 1½ hours, 2½ hours, 4 hours, 5½ hours and 7 hours. The tests were made weekly. The results are set out in the following Table II:

TABLE II

| Product | Dose, mg./kg. | Percent of appetite inhibition after— | | |
|---|---|---|---|---|
| | | 1 hour | 4 hours | 7 hours |
| Compound No. 1 | 2.5 | 96 | 83 | 44 |
| | 5 | 100 | 100 | 99 |
| Phentermine (hydrochloride) | 2.5 | 100 | 12 | 1 |
| | 5 | 100 | 87 | 56 |
| Amphetamine (sulphate) | [1] 0.85 | 93 | 67 | 8 |

[1] Smaller dose necessary because of secondary effects.

From Tables I and II it can be seen that Compound No. 1 has superior anorexigenic activities, particularly when applied to dogs four hours after administration, the activity of the derivative according to the invention always being 100% while that of phentermine is only 12%.

Compound No. 4 also has a decidedly good though less intense anorexigenic activity. Its low toxicity and excellent tolerance, due to the absence of cortical excitation and to its slightly hypotensive action, as opposed to other anorexigenic compounds, permits it to be administered in doses higher than those usually employed for products of this type.

(3) Stimulant effect on the central nervous system (a) In dogs.—This investigation was carried out on the same animals and at the same time as the investigation into anorexigenic activity. For Compound No. 1, the maximum of excitation was reached after 2½ hours and the compound was still effective after 8 hours, and was still effective after 8 hours, whereas phentermine had its maximum after the first hour, and it was zero after 8 hours.

(b) In mice. The stimulant effect of the derivatives was studied using the trembling cage method in comparison with an equivalent dose of racemic amphetamine sulphate, the products being administered intraperitoneally. The degree of excitation was evaluated as the ratio of the maximum activity to the spontaneous activity of the product investigated.

A dose of 5 mg./kg. of Compounds Nos. 1, 4 and 5 did not have any marked stimulant effect, whereas amphetamine increased by 3½ times the initial motive activity; with a dose of 7.5 mg./kg., the excitation ratio is 2.4 for Compound No. 1, 2 for Compound 4, and 4.8 for amphetamine. Compounds Nos. 1 and 4 thus have a stimulatant effect on the central nervous system which is less marked than that of amphetamine; this is advantageous as it is known that the effect of amphetamine is too intense.

The secondary effects of the Compounds Nos. 1, 2, 3 and 4 have been compared with those produced by amphetamine. They are very clearly reduced, particularly those on the respiratory system, body temperature and the autonomic nervous system. Furthermore, with a dose of 5 to 10 mg./kg. of Compound No. 1 or 4 a slight hypotension of 3.9 to 6.2 cm. Hg was caused when administered intraperitoneally to an anesthetised rabbit.

The interesting pharmacological properties of the compounds used in the new pharmaceutical compositions, in inducing anorexia and euphoria, as well as their low toxicity, permit them to be used therapeutically in the treatment of simple obesities or obesities associated with certain pathological conditions, and appetite reducers. Compounds Nos. 1, 2, 3 and 4 have been used clinically and found to give satisfactory results without the patients having any unpleasant side effects.

The compositions of the invention may be in any appropriate solid or liquid pharmaceutical form adapted to the anticipated mode of administration, such as simple or sugar-coated tablets, progressively disintegrating tablets, slow-acting tablets, capsules, gelules, injectable or drinkable ampoules and supporitories. These different forms may be made using the excipients normally employed for the form in question, e.g. starch, magnesium stearate, talc, lactose, resins, aqueous or oily vehicles, cocoa butter, semi-synthetic glycerides, emulsifiers, adjuvants for flow-acting forms, various preservatives and aromatics.

Generally speaking compositions for oral administration contain solid or semi-solid diluents or are in the form of syrups or elixirs. Compositions for parenteral administration contain the active substance dissolved in a sterile injectable liquid. In either case, the concentration of active substance is from 0.5 to 50% by weight.

The useful therapeutic dose varies with the subject and the seriousness of the case. Generally speaking, between 0.005 g. and 0.250 g. is administered daily perorally to the patient, so that tablets each containing 0.002 to 0.1 g. of active ingredient are preferred. Thus, tablets containing 0.01 g. of (racemic, laevorotatory or dextrorotatory N-(β-cyanoethyl)-α-methyl-β-phenylethylamine hydrochloride, or 0.05 g. of N-methyl-N-(β-cyanoethyl)-α-methyl-β-phenylethylamine, each may be administered at a rate of three tablets per day, and have been perfectly well tolerated by the patient. Clinical confirmation of the pharmacological qualities of the active compounds has been obtained.

The following examples of pharmaceutical compositions illustrate the invention.

EXAMPLE 5

Tablets were prepared having the formula:

| | G. |
|---|---|
| Racemic N - (β - cyanoethyl)-α-methyl-β-phenylethylamine hydrochloride | 0.010 |
| Excipient (lactose, starch, talc, magnesium stearate) quantity sufficient for 1 tablet weighing | 0.160 |

EXAMPLE 6

Tablets were prepared having the formula:

| | G. |
|---|---|
| Laevorotatory N - (β - cyanoethyl) - α-methyl-β-phenylethylamine hydrochloride | 0.015 |
| Excipient (lactose, starch, talc, magnesium stearate) quantity sufficient for 1 tablet weighing | 0.160 |

EXAMPLE 7

Tablets were prepared having the formula:

| | G. |
|---|---|
| Dextrorotatory N - (β - cyanoethyl) - α-methyl-β-phenylethylamine hydrochloride | 0.005 |
| Excipient (lactose, starch, talc, magnesium stearate) quantity sufficient for 1 tablet weighing | 0.150 |

EXAMPLE 8

Tablets were prepared having the formula:

| | G. |
|---|---|
| N - (β - cyanoethyl)-α-methyl-β-phenylethylamine hydrochloride | 0.050 |
| Excipient (lactose, starch, talc, magnesium stearate) quantity sufficient for 1 tablet weighing | 0.150 |

EXAMPLE 9

Tablets were prepared containing 0.050 g. of active principle with an enterosoluble nucleus, and having the formula:

(a) Nucleus

| | G. |
|---|---|
| N - (β - cyanoethyl) - N-methyl-α-methyl-β-phenylethylamine hydrochloride | 0.025 |
| Excipient (lactose, starch, talc, magnesium stearate) q.s. | 0.130 |
| Enterosoluble varnish | 0.010 |

(b) External layer

| | G. |
|---|---|
| N - (β - cyanoethyl) - N-methyl-α-methyl-β-phenylethylamine hydrochloride | 0.025 |
| Excipient (lactose, starch, talc, magnesium stearate) q.s. for a tablet weighing | 0.320 |

EXAMPLE 10

Tablets were prepared containing 0.010 g. of active principle with an enterosoluble nucleus, and having the formula:

(a) Nucleus

| | G. |
|---|---|
| N - (β - chloroethyl)-α-methyl-β-phenylethylamine hydrochloride | 0.005 |
| Excipient (lactose, starch, talc, magnesium stearate), q.s. | 0.130 |
| Enterosoluble varnish | 0.010 |

(b) External layer

| | G. |
|---|---|
| N - (β - chloroethyl)-α-methyl-β-phenylethylamine hydrochloride | 0.005 |
| Excipient (lactose, starch, talc, magnesium stearate), q.s. for 1 tablet weighing | 0.320 |

We claim:

1. An anorexigenic composition in the form of a solid, semi-solid, injectable liquid, syrup or elixir, comprising: an appetite reducing amount of a compound selected from the group consisting of racemic N-(β-cyanoethyl)-α-methyl-β-phenylethylamine and pharmaceutically acceptable acid addition salts thereof in association with a pharmaceutically acceptable and compatible carrier.

2. The composition of claim 1 wherein the compound is racemic N - (β - cyanoethyl)-α-methyl-β-phenylethylamine.

3. The composition of claim 1 wherein the compound is the hydrochloride of racemic N-(β-cyanoethyl)-α-methyl-β-phenylethylamine.

4. The composition as defined in claim 1 in the form of a tablet.

5. An anorexigenic composition in the form of a solid, semi-solid, injectable liquid, syrup or elixir, comprising: an appetite reducing amount of a compound selected from the group consisting of N-methyl-N-(β-cyanoethyl)-α-methyl-β-phenylethylamine and pharmaceutically acceptable acid addition salts thereof in association with a pharmaceutically acceptable and compatible carrier.

6. The composition of claim 5 wherein the compound is N-methyl-N-(β - cyanoethyl) - α - methyl - β-phenylethylamine.

7. The composition of claim 5 wherein the compound is the hydrochloride of N-methyl-N-(β-cyanoethyl)-α-methyl-β-phenylethylamine.

8. The composition as defined in claim 5 in the form of a tablet.

9. An anorexigenic composition in the form of a solid, semi-solid, injectable liquid, syrup or elixir, comprising: an appetite reducing amount of a compound selected from the group consisting of laevorotatory N-(β-cyanoethyl)-α-methyl-β-phenylethylamine and pharmaceutically acceptable acid addition salts thereof in association with a pharmaceutically acceptable and compatible carrier.

10. The composition of claim 9 wherein the compound is laevorotatory N-(β - cyanoethyl)-α-methyl-β-phenylethylamine.

11. The composition of claim 9 wherein the compound is the hydrochloride of laevorotatory N-(β-cyanoethyl)-α-methyl-β-phenylethylamine.

12. The composition as defined in claim 9 in the form of a tablet.

13. An anorexigenic composition in the form of a solid, semi-solid, injectable liquid, syrup or elixir, comprising: an appetite reducing amount of a compound selected from the group consisting of dextrorotatory N-(β-cyanoethyl)-α-methyl-β-phenylethylamine and pharmaceutically acceptable acid addition salts thereof in association with a pharmaceutically acceptable and compatible carrier.

14. The composition of claim 13 wherein the compound is dextrorotatory N-(β-cyanoethyl)-α-methyl-β-phenylethylamine.

15. The composition of claim 13 wherein the compound is the hydrochloride of dextrorotatory N-(β-cyanoethyl)-α-methyl-β-phenylethylamine.

16. The composition as defined in claim 13 in the form of a tablet.

17. A method of reducing appetite in animals comprising: administering to an animal in an appetite reducing amount a compound selected from the group consisting of racemic N-($\beta$ - cyanoethyl)-$\alpha$-methyl-$\beta$-phenylethylamine and pharmaceutically acceptable acid addition salts thereof in association with a pharmaceutically acceptable and compatible carrier.

18. The method as defined in claim 17 wherein the composition is in a form suitable for oral administration.

19. The method as defined in claim 17 wherein the composition is in the form of a suppository.

20. The method as defined in claim 17 wherein the composition is in the form of a tablet.

21. A method of reducing appetite in animals comprising: administering to an animal in an appetite reducing amount a compound selected from the group consisting of N-methyl-N-($\beta$ - cyanoethyl)-$\alpha$-methyl-$\beta$-phenylethylamine and pharmaceutically acceptable acid addition salts thereof in association with a pharmaceutically acceptable and compatible carrier.

22. The method as defined in claim 21 wherein the composition is in a form suitable for oral administration.

23. The method as defined in claim 21 wherein the composition is in the form of a suppository.

24. The method as defined in claim 21 wherein the composition is in the form of a tablet.

25. A method of reducing appetite in animals comprising: administering to an animal in an appetite reducing amount a compound selected from the group consisting of laevorotatory N-($\beta$ - cyanoethyl)-$\alpha$-methyl-$\beta$-phenylethylamine and pharmaceutically acceptable acid addition salts thereof in association with a pharmaceutically acceptable and compatible carrier.

26. The method as defined in claim 25 wherein the composition is in a form suitable for oral administration.

27. The method as defined in claim 25 wherein the composition is in the form of a suppository.

28. The method as defined in claim 25 wherein the composition is in the form of a tablet.

29. A method of reducing appetite in animals comprising: administering to an animal in an appetite reducing amount a compound selected from the group consisting of dextrorotatory N-($\beta$ - cyanoethyl)-$\alpha$-methyl-$\alpha$-methyl-$\beta$-phenylethylamine and pharmaceutically acceptable acid addition salts thereof in association with a pharmaceutically acceptable and compatible carrier.

30. The method as defined in claim 29 wherein the composition is in a form suitable for oral administration.

31. The method as defined in claim 29 wherein the composition is in the form of a suppository.

32. The method as defined in claim 29 wherein the composition is in the form of a tablet.

References Cited

UNITED STATES PATENTS

| | | |
|---|---|---|
| 3,143,463 | 8/1964 | Holm et al. |
| 3,149,147 | 9/1964 | Anderson et al. |
| 3,320,319 | 5/1967 | Schuler et al. |

OTHER REFERENCES

Stevenson et al., J. Amer. Chem. Soc., 80, No. 22, pp. 5943–5947, November 1958.

ALBERT T. MEYERS, Primary Examiner

STANLEY T. MEYERS, Assistant Examiner